United States Patent [19]

Regache

[11] Patent Number: 5,873,089
[45] Date of Patent: Feb. 16, 1999

[54] DATA HANDLING SYSTEM WITH CIRCULAR QUEUE FORMED IN PAGED MEMORY

[75] Inventor: Pascal Regache, Fort Collins, Colo.

[73] Assignee: Hewlett-Packard Company, Palo Alto, Calif.

[21] Appl. No.: 689,893

[22] Filed: Aug. 15, 1996

[30] Foreign Application Priority Data

Sep. 4, 1995 [EP] European Pat. Off. ............. 95410092

[51] Int. Cl.⁶ .................................................. G06F 17/30
[52] U.S. Cl. .......................................... 707/100; 370/412
[58] Field of Search .................................... 707/100, 101, 707/102, 103, 104

[56] References Cited

U.S. PATENT DOCUMENTS

| | | | |
|---|---|---|---|
| 4,507,760 | 3/1985 | Fraser | 365/221 |
| 4,611,322 | 9/1986 | Larson et al. | 370/60 |
| 4,682,284 | 7/1987 | Schrofer | 364/200 |
| 4,713,754 | 12/1987 | Agarwal et al. | 707/100 |
| 4,807,111 | 2/1989 | Cohen et al. | 395/874 |
| 4,816,996 | 3/1989 | Hill et al. | 395/825 |
| 4,888,739 | 12/1989 | Frederick et al. | 365/221 |
| 4,914,652 | 4/1990 | Nguyen | 370/85.5 |
| 4,951,280 | 8/1990 | McCool et al. | 370/85.12 |
| 5,043,981 | 8/1991 | Firoozmand et al. | 370/235 |
| 5,065,397 | 11/1991 | Shiobara | 370/85.5 |
| 5,115,504 | 5/1992 | Belove et al. | 707/100 |
| 5,136,582 | 8/1992 | Firoozmand | 370/85.1 |
| 5,202,988 | 4/1993 | Spix et al. | 395/200.64 |
| 5,303,367 | 4/1994 | Leenstra, Sr. et al. | 707/102 |
| 5,412,483 | 5/1995 | Ludlow et al. | 358/401 |
| 5,448,558 | 9/1995 | Gildea et al. | 370/60 |
| 5,497,489 | 3/1996 | Menne | 707/1 |
| 5,519,701 | 5/1996 | Colmant et al. | 370/412 |
| 5,530,957 | 6/1996 | Koenig | 707/100 |
| 5,539,899 | 7/1996 | Huynh et al. | 711/171 |
| 5,548,759 | 8/1996 | Lipe | 707/100 |
| 5,553,220 | 9/1996 | Keene | 395/520 |
| 5,581,705 | 12/1996 | Passint et al. | 395/200.13 |
| 5,594,927 | 1/1997 | Lee et al. | 395/886 |

FOREIGN PATENT DOCUMENTS 0360899  4/1990  European Pat. Off. .

OTHER PUBLICATIONS

Wenzel et al, IEEE Standard Control and Status Register (CSR) Architecture for Microcomputer Buses, IEEE, pp. 1–135, Jul. 1992.

IBM Technical Disclosure Bulletin, vol. 38, No. 4, Apr. 1995 New York US, p. 231 XP 000516132 'First In/First Out with Programmable Intermediate Pointer' *the whole document*.

IBM Technical Disclosure Bulletin, vol. 18, No. 7, Dec. 1975 New York US, pp. 2131–2135, A. Duke 'FIFO Queue Management Technique' *the whole document*.

*Primary Examiner*—Thomas G. Black
*Assistant Examiner*—Frantz Coby

[57] ABSTRACT

A data handling system is provided in which a circular queue formed in paged memory is used to buffer the transfer of data items between a producer entity and a consumer entity. The producer entity maintains a tail pointer into the queue to indicate the storage location next to be written to; similarly, the consumer entity maintains a head pointer to indicate the storage location next to be read. Since the head and tail pointers may point to different memory pages and these may not have been assigned in a contiguous block to the circular queue, the derivation of queue status information using the head and tail pointers is complex. To simplify this task, the producer and consumer entities maintain producer and consumer indexes for the next write and read positions based on a logical view of the queue as a circular continuum of storage locations.

17 Claims, 6 Drawing Sheets

(EMPTY)

FIG. 5

(FULL)

FIG. 6

(PARTIALLY FULL)

FIG. 9

DATA HANDLING SYSTEM WITH CIRCULAR QUEUE FORMED IN PAGED MEMORY

FIELD OF THE INVENTION

The present invention relates to a data handling system in which a circular queue formed in paged memory is used to buffer the transfer of data items between a producer entity and a consumer entity.

BACKGROUND OF THE INVENTION

Figure 1:
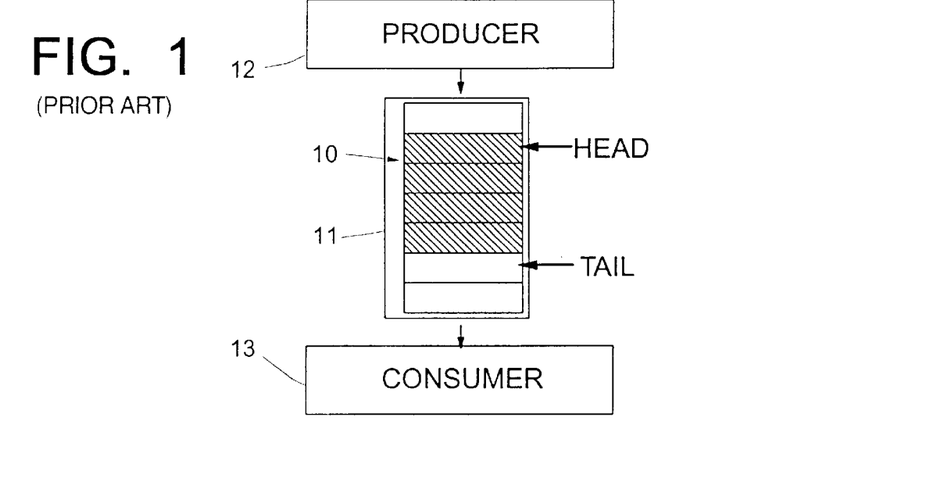
FIG. 1 is a diagram of a circular queue for passing data items between a producer entity and a consumer entity, the circular queue being formed in a continuous block of memory.

It is well known to use a circular queue to buffer the transfer of data items between producer and consumer entities. FIG. 1 of the accompanying drawings is a diagram illustrating such an arrangement in the case where the circular queue 10 comprises N data-item storage locations formed in a continuous block of memory 11 (in FIG. 1, N=7). Storage locations holding data items are shown hatched whilst empty ones have been left blank; this convention is used throughout the present specification. A producer entity 12 wishing to pass a data item to a consumer entity 13 does so by writing the data item into a storage location of the circular queue 10 pointed to by a current write position pointer (the "tail" pointer). The tail pointer is maintained by the producer entity 12, being updated each time a data item is written to the queue 10. The consumer entity 13 reads a data item from the queue 10 when it is ready to do so, the data item being read from a storage location pointed to by a current read pointer (the "head" pointer). The head pointer is maintained by the consumer entity 13, being updated each time a data item is read from to the queue 10.

As used in the present specification, the term "storage location" means an area of memory sized to hold a data item; this may correspond to one addressable memory location or to a plurality of addressable memory locations.

The updating of the head and tail pointers involves incrementing them by an amount corresponding to the number of addressable memory locations occupied by a data item, each pointer being reset to the base address in memory of the circular queue each time the high end of the queue is reached.

In the FIG. 1 arrangement for which the queue storage locations form a continuum in the same memory block, it is a relatively simple matter to determine the status of the queue (that is, how full the queue is) as this can be done by subtracting the head pointer from the tail pointer, modulo queue address range.

Figure 2:
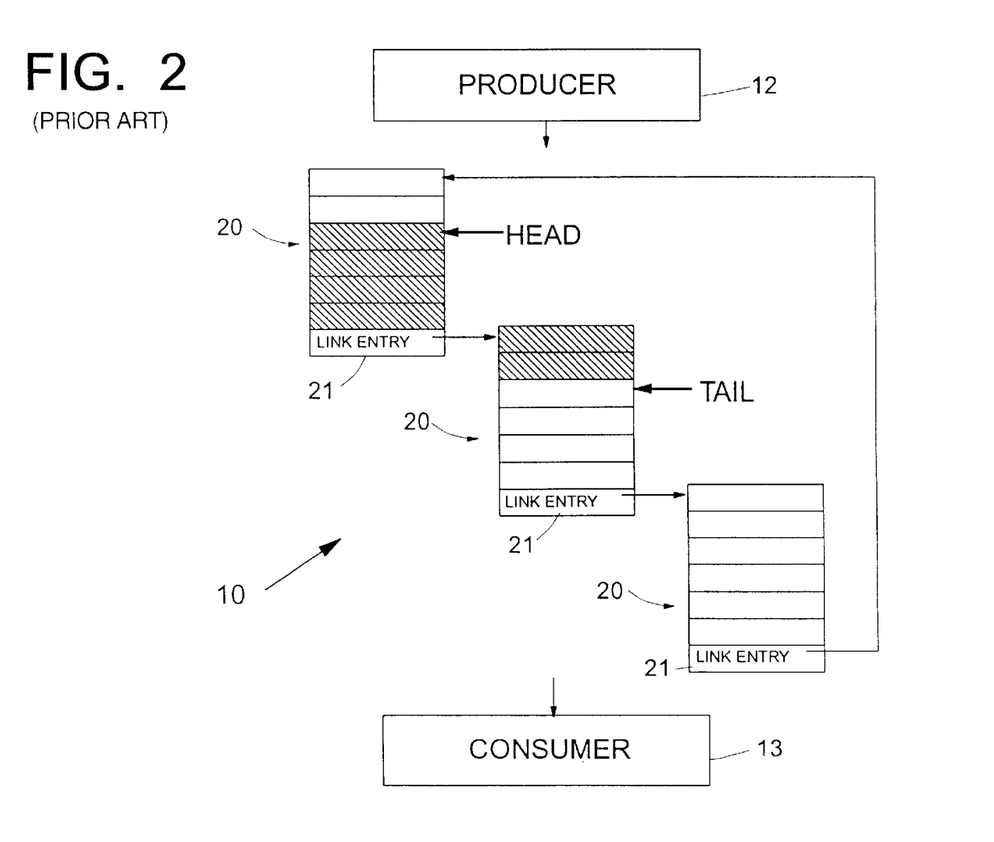
FIG. 2 is a diagram similar to FIG. 1 but with the circular queue formed across pages of a paged memory.

The above-described arrangement has limitations in practice because it relies on the storage locations being contiguous in memory. Most computer systems nowadays use a paged memory arrangement in which memory is organised into blocks of contiguous memory known as pages (for example, of 4 kbytes in size). When such a system allocates multiple memory pages to meet a need for a large amount of memory, there is generally no guarantee that the allocated pages will be contiguous. As a result, the simple circular queue arrangement of FIG. 1 can only be used for small queues that will fit into a single memory page; the FIG. 1 arrangement cannot be used for larger queues requiring multiple memory pages. Where such a larger queue is required, then appropriate measures must be taken to link the segments of the queue appearing in different memory pages. FIG. 2 of the accompanying drawings illustrates such a circular queue 10 having segments 20 in three separate memory pages.

As is shown in FIG. 2, each queue segment 20 ends with a link entry 21 that is stored in a location in the memory page concerned immediately following the last data-item storage location. This link entry 21 contains an address pointer pointing to the address in memory of the first storage location of the next queue segment 20.

Each time the producer or consumer entity encounters a link entry 21 it updates the tail or head pointer (as appropriate) to the address pointed to in the link entry. Detection of the link entry can be effected by using a special flag stored in each segment location to indicate whether or not the location holds the link entry. Alternatively, if the producer/consumer entity knows how many data-items storage locations there are in a queue segment 20, it can keep a count of how many storage locations remain to be accessed (written to/read from), and then when this count reaches zero, the entity will know that the next location holds the link entry.

Determining queue status for the FIG. 2 queue presents more difficulties than for the case where the queue is all formed in a single memory page. If only queue full or queue empty status is needed, then it is possible to do this simply by comparing head or tail addresses where full and empty are defined as being when the pointers both point to the same location (as will be described later, this is generally not desirable as it is then not possible to tell from the pointers themselves whether the queue is full whether it is empty when the pointers are equal). However, checking for any other queue condition (such as nearly empty or nearly full) immediately runs into the problem that the head and tail pointers may point to locations on different, noncontiguous, memory pages. In this case, a very careful accounting must be made of the address ranges of the queue segments if the head and tail pointers are to serve to provide useful queue status information and this accounting will require several memory accesses.

It is an object of the present invention to facilitate derivation of queue status information where circular queues are formed across pages boundaries in paged memory.

SUMMARY OF THE INVENTION

In general terms, the present invention facilitates queue status determination, by maintaining, in addition to write/read pointers pointing to physical address locations, an overall logical view of the queue in terms of indexes into a notional circular continuum of N storage locations (N being the total number of data-item storage locations in the circular queue).

More particularly, according to one aspect of the present invention, there is provided a producer entity for writing data items in sequence to a circular queue formed in paged memory from N data-item storage locations provided from at least two memory pages, the producer entity comprising:

a write-address manager for maintaining an indicator of the address in paged memory of the storage location next to be written to, queue write means for writing a data item to the storage location indicated by the indicator maintained by the write-address manager, a producer-index manager for storing a producer index indicative, in terms of a position within a notional circular continuum of N storage locations, of the storage location to which a data item is next to be written, and status determining means for determining the status of the circular queue by comparing the producer index with a consumer index received from externally of the producer entity, said consumer index being indicative, in terms of a position within said notional circular continuum of N storage locations, of the queue storage location from which a data item is next to be read.

Preferably, the producer-index manager comprises a producer-index register for storing said producer index, and means for incrementing the producer index on a modulo-N basis each time a data item is written to the queue by the queue write means.

Advantageously, the status determining means is operative to determine that the circular queue is full when the producer index indicates a position in said circular continuum of N storage locations immediately preceding that indicated by the consumer index.

As regards the write-address manager, this may comprise a write-address register for holding said indicator of the address in paged memory of the storage location next to be written to, and means for updating this indicator both to take account of the writing of each data item and of changes between memory pages.

According to another aspect of the present invention, there is provided a consumer entity for reading data items in sequence from a circular queue formed in paged memory from N data-item storage locations provided from at least two memory pages, the consumer entity comprising:

a read-address manager for maintaining an indicator of the address in paged memory of the storage location next to be read from;

queue read means for reading a data item from the storage location indicated by the indicator maintained by the read-address manager, a consumer-index manager for maintaining a consumer index indicative, in terms of a position within a notional circular continuum of N storage locations, of the storage location from which a data item is next to be read, and status determining means for determining the status of the circular queue by comparing said consumer index with a producer index received from externally of the consumer entity, the producer index being indicative, in terms of a position within said notional circular continuum of N storage locations, of the queue storage location to which a data item is next to be written.

Preferably, the consumer-index manager comprises a consumer-index register for storing said consumer index, and means for incrementing the consumer index on a modulo-N basis each time a data item is read from the queue by said queue read means.

Advantageously, the status determining means is operative to determine that the circular queue is empty when the producer and consumer indexes indicate the same position in said continuum of N storage locations.

With respect to the read-address manager, this may comprise a read-address register for holding said indicator of the address in paged memory of the storage location next to be read from, and means for updating this indicator both to take account of the reading of each data item and of changes between memory pages.

According to a further aspect of the present invention, there is provided a data handling system comprising:

a paged memory having multiple memory pages, a circular queue made up of a plurality of segments formed in respective ones of said memory pages and each comprising a number of data-item storage locations provided in the corresponding memory page, there being a total of N such data-item storage locations in the circular queue, a producer entity for writing a data item to the circular-queue storage location corresponding to a current write position for the circular queue, and a consumer entity for reading a data item from the circular-queue storage location corresponding to a current read position for the circular queue; each entity having:

a first register storing a physical-location indicator indicative of said current write/read position, as appropriate for the entity concerned, in terms of the whereabouts of the corresponding storage location in the paged memory, first update means for updating the physical-location indicator in dependence on the writing/reading of data items by the entity concerned to/from the circular queue and on a change of the memory page in which the storage location corresponding to the current write/read position is situated, a second register storing a logical-location indicator indicative of the current write/read position in terms of a position within a continuum of N locations, and second update means for incrementing the logical-location indicator on a modulo-N basis in dependence on the writing/reading of data items by the entity concerned to/from the circular queue;

the data handling means having queue status means that uses the logical-location indicators maintained by the producer and consumer entities to determine information on the current state of the circular queue.

Preferably, the queue status means comprises:

in said consumer entity, queue-empty detection means for comparing said logical-location indicators to determine when the circular queue is empty, in said producer entity, queue-full detection means for comparing said logical-location indicators to determine when the circular queue is full.

Advantageously, the queue-empty detection means is operative to determine that the circular queue is empty when the logical indicators indicate the same position in said continuum of N locations, and the queue-full detection means is operative to determine that the circular is full when the logical-location indicator maintained by the producer entity indicates a position in said continuum of N locations immediately preceding that indicated by the logical-location indicator maintained by the consumer entity. In this way, there is no confusion between the full and empty conditions; however, it should be noted that in the queue full condition, there is, in fact still one empty storage location in the circular queue.

Preferably, each segment of the circular queue further comprises a link location storing a pointer to the address in memory of a next said segment in the circular queue, this link location being in a predetermined position in each segment (typically at the end). This pointer is used to enable an entity to access the next queue segment when all the data-item storage locations in the current segment have been accessed (written to or read).

To this end, the entity may include a third register for holding a count indicative of the number of data-item storage locations remaining to be accessed in the current segment, and the first update means comprises:

means for updating this count each time a data-item storage location of the current segment is accessed, and means responsive to the count indicating that no further data-item storage locations remain to be accessed in the current segment, to extract the pointer from the segment link location and insert it in the first register of the entity.

With this arrangement, in order to accommodate differing number of storage locations in each segment, the link location of each segment may further contain an indicator of the number of data-item storage locations in the next queue segment, this indicator being extracted from the link location and inserted into the third register by the first update means contemporaneously with the latter extracting the pointer from the same link location and inserting it in the first register.

As an alternative to maintaining a count indicative of the number of data-item storage locations remaining to be accessed in the current segment, it is possible to use flags stored in each segment location to distinguish the link location from the data-item storage locations. In this case, the first update means of an entity is arranged to extract the pointer from the link location when the latter is encountered and, after all the storage locations in the segment have been accessed, to insert this pointer into the first register. The link location need not be the last location in each segment though this is preferred. The use of flags is more appropriate for the consumer entity as this entity must in any case read the segment locations whereas use of flags by the producer entity requires the latter to read from as well as write to the segment locations.

BRIEF DESCRIPTION OF THE DRAWINGS

A data handling system embodying the invention will now be described, by way of non-limiting example, with reference to the accompanying diagrammatic drawings, in which.

BEST MODE OF CARRYING OUT THE INVENTION

Figure 3:
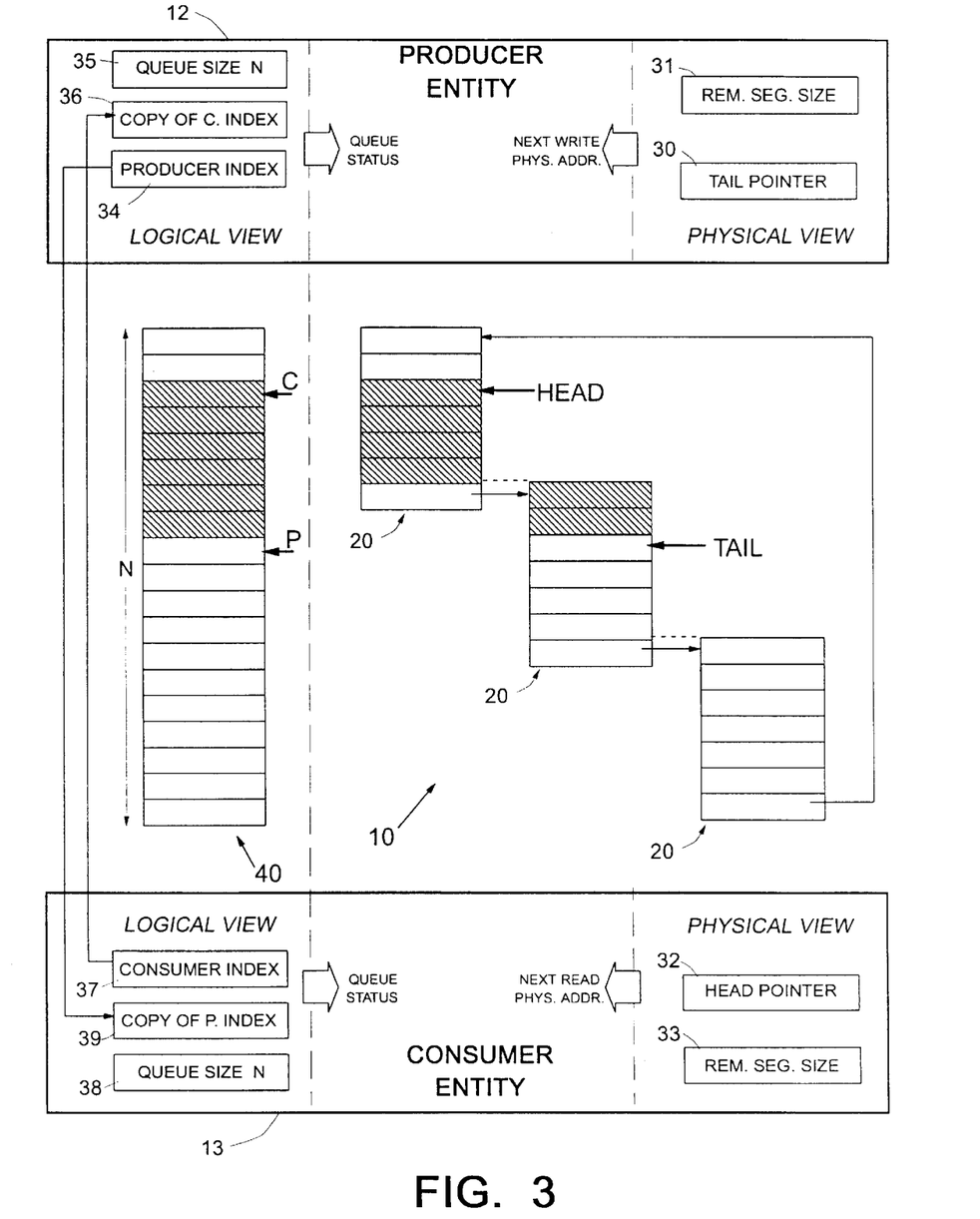
FIG. 3 is a diagram similar to FIG. 2 but additionally illustrating a notional queue maintained by the producer and consumer entities to facilitate the generation of queue status information in accordance with the present invention.

FIG. 3 shows a circular queue 10 formed in paged memory and used to buffer the transfer of data items between a producer entity 12 and a consumer entity 13. The overall arrangement shown in FIG. 3 is similar to that of FIG. 2 as regards the circular queue itself and the maintenance of head and tail pointers.

Thus, in the FIG. 3 arrangement, the producer entity 12 maintains a tail pointer in register 30, this pointer corresponding to the address in memory of the next storage location to be written to. This pointer is maintained within a queue segment (that is, for storage locations within the same memory page) by updating it each time a data item is written by the number of memory addresses occupied by each data item. To determine when all data-item storage locations in the current segment have been used, the producer entity 12 maintains in register 31 a count of the number of storage locations to be written in the current segment. This count is initialised at the commencement of usage of the segment to a value corresponding to the number of data-item storage locations in the segment. This number may be a constant, the same for all segments, or may vary from segment to segment. In this latter case, the number of storage locations in the current segment is preferably stored in the link entry maintained at the end of the preceding segment and loaded into the register 31 at the commencement of usage of the current segment. The count in register 31 is decremented each time a data-item storage location is written to. Upon the count value in register 31 becoming equal to zero, the producer entity reads the next location (pointed to by the tail pointer) to retrieve the link entry giving the address of the first storage location of the next segment and the size of the segment (in terms of the number of data-item storage locations); these two pieces of information are loaded into the tail-pointer register 30 and the remaining-segment-size register 31 ready for writing the next data item to a new queue segment in a different memory page.

In a similar manner, the consumer entity 13 maintains a consumer pointer in register 32 with a count of the remaining number of storage locations to be accessed in the current queue segment being held in register 33.

As regards the determination of queue status information, this is performed by the producer and consumer entities cooperating to maintain a notional logical view of the queue as a continuous of N storage locations (where N represents the total number of data-item storage locations provided overall by the circular queue 10). This continuum is illustrated at 40 in FIG. 3 but it is stressed that this a notional element, not a real one.

The producer entity 12 maintains in register 34 a P-Index that represents the location in the queue next to be written to, in terms of a position in the notional continuum 40. This P-Index is incremented each time a data item is written to the queue, this incrementing being effected on a modulo N basis (for which purpose the value of N is maintained in a Q-size register 35). In FIG. 3, the P-Index is represented in relation to the depicted continuum 40 by an arrow and the letter "P".

In a similar manner, the consumer index maintains in register 37 a C-Index that represents the location in the queue next to be read from, in terms of a position in the notional continuum 40. The C-Index is incremented on a modulo N basis each time a data item is read from the queue 10. This queue size is kept in register 35 of the consumer entity 13. The C-Index is represented in relation to continuum 40 in FIG. 3 by an arrow and the letter "C".

The producer entity 12 is provided with a copy of the C-Index, this copy being kept in register 36. The consumer entity 13 is provided with a copy of the P-Index, this copy being kept in register 39.

The producer entity 12 can now derive queue status information by subtracting its stored copy of the C-Index, from P-Index on a module N basis. Similarly, the consumer entity 13 can derive queue status information by subtracting its stored copy of the P-Index from C-Index on module N basis.

Figure 4:
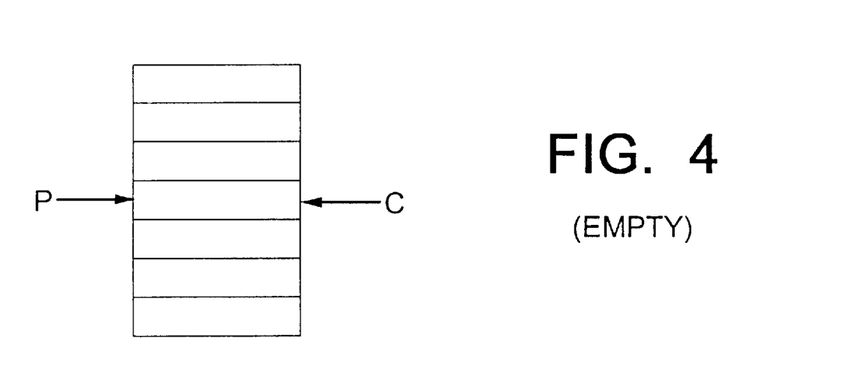
FIG. 4 is a diagram illustrating the relative positioning of producer and consumer indexes when the notional queue shown in FIG. 3 is considered empty.

At this point it is appropriate to comment on the tests used for queue full and queue empty. In the present example, the queue 10 is said to be empty when the P-Index and C-Index represent the same position in the continuum 40 (this, in turn, corresponding to the head and tail pointers pointing to the same storage location in queue 10). FIG. 4 illustrates this condition (for simplicity, the continuum 40 has been shortened from its FIG. 3 length). If now the queue full condition was similarly defined (P-Index and C-Index representing the same position in continuum 40), then it would not be possible to distinguish a queue full condition from a queue empty condition simply by examining P-Index and C-Index. To overcome this problem, the queue full condition is defined as when P-Index represents a position immediately preceding that represented by C-Index in the continuum 40 (see FIG. 5). This results in there being an empty storage location in the queue when the P-Index and C-Index are taken as indicating a queue full condition.

Figure 5:
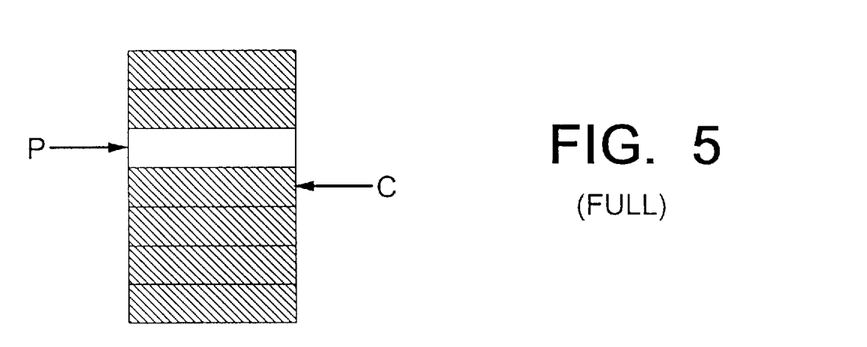
FIG. 5 is a diagram illustrating the relative positioning of producer and consumer indexes when the notional queue shown in FIG. 3 is considered full.
Figure 6:
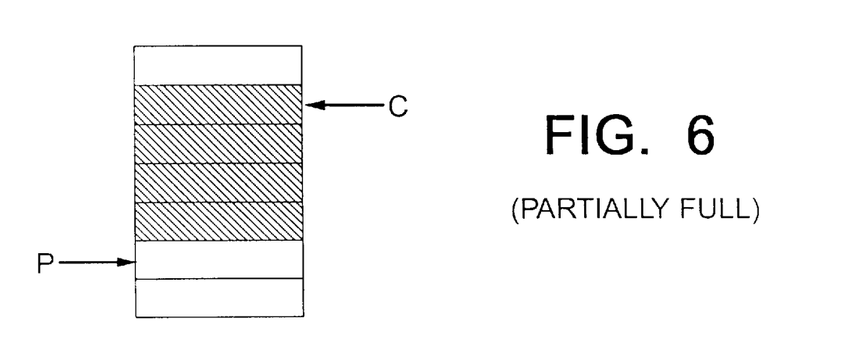
FIG. 6 is a diagram illustrating the relative positioning of producer and consumer indexes when the notional queue shown in FIG. 3 is in a partially full state.

FIG. 6 is similar to FIGS. 4 and 5 but illustrates positions represented by P-Index and C-Index in the case where the queue is only partially fully.

Figure 7:
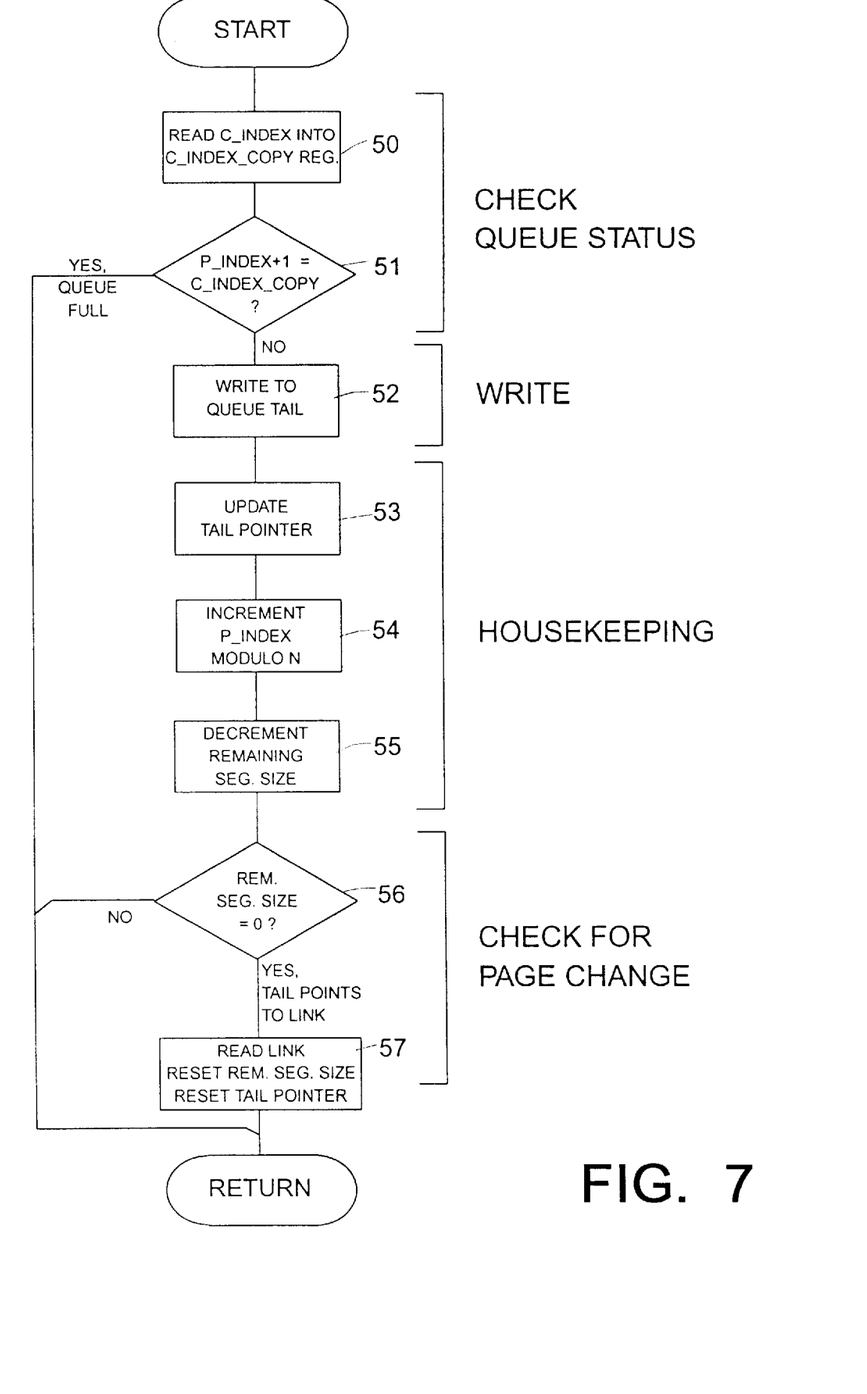
FIG. 7 is a flow chart illustrating operation of the FIG. 3 producer entity.

FIG. 7 illustrates in flow chart form the steps executed by the producer entity 12 when it writes a data-item to a storage location in the circular queue. This flow chart may be implemented as a program on a processor in the case where the producer entity 12 is processor based.

When the producer entity wants to pass a data item to the circular queue, it first checks the queue status. It does this by reading the C-Index value maintained by the consumer entity into the producer-entity register 36 (step 50), and then comparing on a module N basis, the value (P-Index+1) with the C-Index copy value in register 36 (step 51). If the compared values are equal the queue is full (as was explained above with reference to FIG. 5) and the producer entity must wait.

If, however, the compared values are not equal, the queue is not full and the producer entity 12 proceeds to write the data item to the next available data-item storage location as indicated by the tail pointer held in register 30 (step 52).

Next, the producer entity 12 carries out various housekeeping tasks to update the registers 30, 31 and 34. In particular, in step 53 the updated according to the s is updated according to the size of the data items; in step 54, the P-Index held in register 34 is incremented on a module N basis; and in step 55, the remaining segment size count held in register 31 is decremented.

Finally, a check is made as to whether the end of the current queue segment has been reached, requiring a change to a new segment in a different memory page. This check involves looking at the remaining segment size count in register 31 (step 56)—if this count is zero the end of the current segment has been reached. In this case, the location pointed to by the tail pointer is read to retrieve the link entry stored at the end of the segment (step 57), and the tail pointer register 30 and remaining segment size register 31 are then updated from the contents of the link entry.

Figure 8:
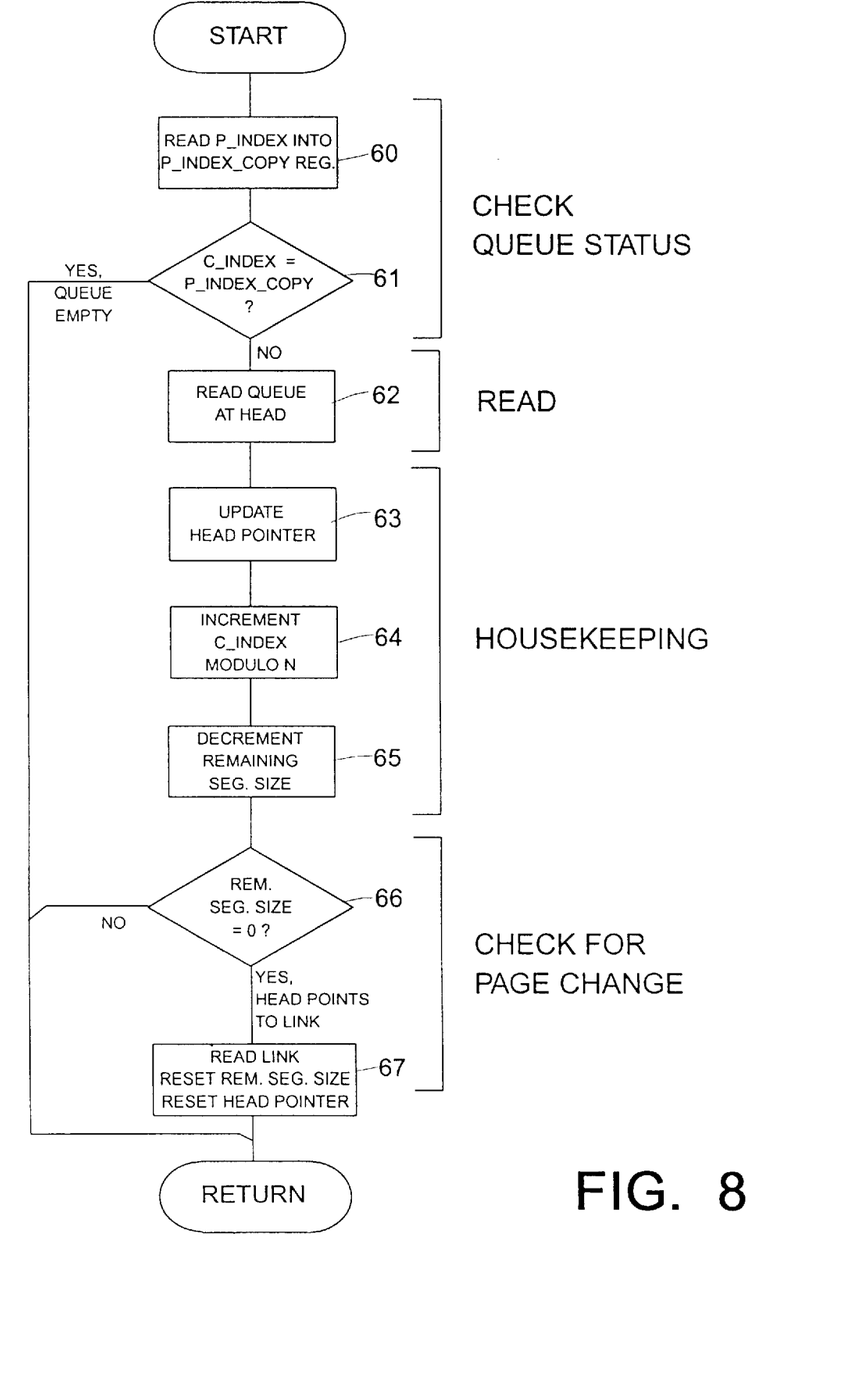
FIG. 8 is a flow chart illustrating operation of the FIG. 3 consumer entity.

FIG. 8 is similar to FIG. 7 but shows the operation of the consumer entity. This operation includes "check queue status" steps 60 and 61, a "data-item read" step 62, "housekeeping" steps 63 to 65, and "end of current segment" steps 66, 67. These steps correspond closely those carried out by the producer entity and will therefore not be described in detail.

If queue thresholds additional to full or empty are to be detected, it will be appreciated that this can be achieved by including further tests after the test of step 51 (FIG. 7) or step 61 (FIG. 8). For example, in FIG. 8 if it is desired to detect the condition of there being only three occupied storage locations, then a further test can be added between blocks 61 and 62 of the form (C_INDEX+3=P_INDEX_COPY ?), a positive result causing the generation of an appropriate indication before step 62 is executed.

Figure 9:
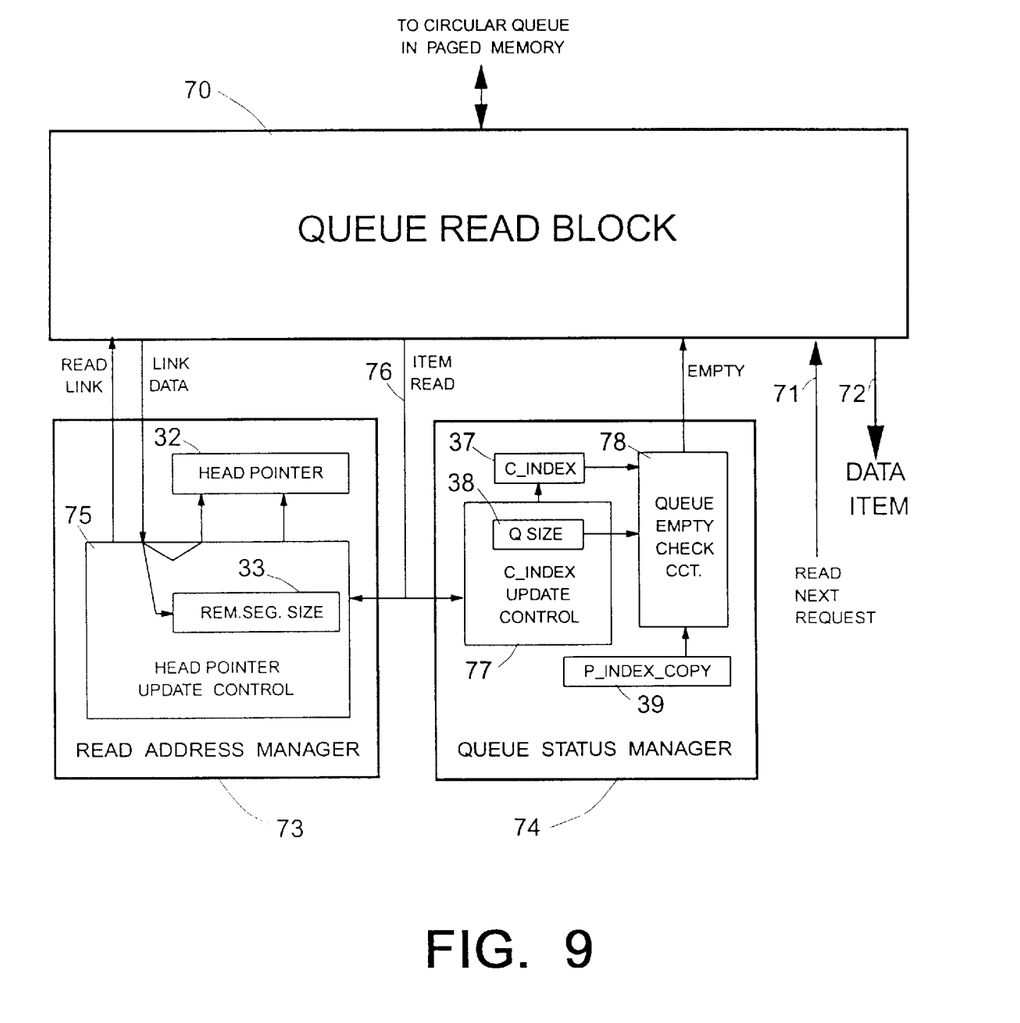
FIG. 9 is a block diagram of a hardware implementation of the FIG. 3 consumer entity.

FIG. 9 illustrates in block diagram form the general structure of a hardware implementation of the queue mechanisms for a consumer entity. The actual reading of the circular queue is effected by a queue read block 70 in response to a 'read next' request received on line 71, this reading being carried out at the location indicated by the head pointer held in register 32. The read data item is output on line (or bus) 72. Queue management is effected by a read address manager 73 and queue status manager 74.

The read address manager 73 maintains the head pointer and includes the head pointer register 32 and remaining segment size register 33. A head pointer update control block 75 is responsible for incrementing register 32 and decrementing register 33 each time a data item is read by the queue read block 70 as indicated by a signal on line 76. In addition, update control block 75 is responsive to the value in register 33 becoming zero to request the queue read block 70 to read the next queue location to retrieve the link entry data. On receiving the link data, the update control block 75 updates the head pointer register 32 and the remaining segment size register 33.

The queue status manager 74 maintains the consumer index and includes the C-Index register 37, the queue size register 38 and the P-Index copy register 39. A C-Index update control block 77 is responsible for incrementing (module N) the C-Index value in register 37 each time a data item is read. The queue status manager 74 also includes a 'queue empty' check circuit 78 operative to compare, on a module N basis, the contents of the C-Index register 37 and the P-Index copy register 39, the circuit 78 outputting an 'empty' signal to the queue read block to inhibit operation of the latter, when the contents of registers 37 and 39 are equal. The P-Index copy register 39 can be arranged to be updated from the P-Index register in the producer entity either each time a 'read next' request is received by the queue read block or each time the producer entity writes a data item to the circular queue.

A similar hardware implementation can be readily derived from the producer entity by persons skilled in the art and so will not be described herein.

The described embodiments thus provide a straightforward, low cost way of efficiently deriving queue status information, particularly in the case where threshold levels additional to full and empty are to be derived.

It will be appreciated that many variants are possible to the circular queue mechanisms described above. For example, as regards maintenance of the head and tail pointers, it would be possible to keep all the information held in the link entries separate from the queue itself and dispense with the link entries; this would generally involve both the consumer and producer entities having copies of the link-entry information and results in a very cumbersome arrangement. Another alternative is to provide the link entry at the beginning or at some other fixed point in a queue segment; whilst this is possible it offers no real advantage and has the drawback of requiring the producer and consumer entities to store the link entry information until requested. For this reason, it is preferred to place the link entry at the end of each segment; this also means that the link entry can be a different size to the data items without thereby incurring any overhead (since the head/tail pointer never has to be incremented by the size of the link entry).

As already indicated, the copying across of the P-Index to the consumer entity and the C-Index to the producer entity may be initiated by either the passing or receiving entity. Alternatively, an intermediate buffer register could be used. In fact, there are advantages in having the producer entity initiate passing of its P-Index each time the latter is updated as this can be used to indicate to the consumer entity that there is a new data-item to be read, possibly moving the consumer entity from an idle state where it had been residing pending a new data item being available.

In a typical implementation, the circular queue would serve as a buffer between a central processor and an interface card, the producer entity being the central processor and the interface card the consumer entity. Of course, as it would generally be desired to have data items flowing in both directions, a second circular queue would be provided for which the interface card was the producer entity and the central processor the consumer entity.

I claim:

1. A producer entity for writing data items in sequence to a single circular queue formed in paged memory from N data-item storage locations provided from at least two memory pages, the producer entity comprising:

a write-address manager for maintaining an indicator of the address in paged memory of the storage location next to be written to, queue write means for writing a data item to the storage location indicated by said indicator maintained by the write-address manager, a producer-index manager for storing a producer index indicative, in terms of a position within a notional circular continuum of N storage locations, of the storage location to which a data item is next to be written, and status determining means for determining the status of the circular queue by comparing said producer index with a consumer index received from externally of the producer entity, said consumer index being indicative, in terms of a position within said notional circular continuum of N storage locations, of the queue storage location from which a data item is next to be read.

2. A producer entity according to claim 1, wherein said producer-index manager comprises:

a producer-index register for storing said producer index, means for incrementing said producer index on a modulo-N basis each time a data item is written to the queue by said queue write means.

3. A producer entity according to claim 1, wherein said status determining means is operative to determine that the circular queue is full when the producer index indicates a position in said circular continuum of N storage locations immediately preceding that indicated by the consumer index.

4. A producer entity according to claim 1, wherein said write-address manager comprises:

write-address register means for holding said indicator of the address in paged memory of the storage location next to be written to, and means for updating said indicator both to take account of the writing of each data item and of changes between memory pages.

5. A consumer entity for reading data items in sequence from a single circular queue formed in paged memory from N data-item storage locations provided from at least two memory pages, the consumer entity comprising:

a read-address manager for maintaining an indicator of the address in paged memory of the storage location next to be read from;

queue read means for reading a data item from the storage location indicated by said indicator maintained by the read-address manager, a consumer-index manager for maintaining a consumer index indicative, in terms of a position within a notional circular continuum of N storage locations, of the storage location from which a data item is next to be read, and status determining means for determining the status of the circular queue by comparing said consumer index with a producer index received from externally of the consumer entity, said producer index being indicative, in terms of a position within said notional circular continuum of N storage locations, of the queue storage location to which a data item is next to be written.

6. A consumer-entity according to claim 5, wherein said consumer-index manager comprises:

a consumer-index register for storing said consumer index, means for incrementing said consumer index on a modulo-N basis each time a data item is read from the queue by said queue read means.

7. A consumer entity according to claim 5, wherein said status determining means is operative to determine that the circular queue is empty when said producer and consumer indexes indicate the same position in said continuum of N storage locations.

8. A consumer entity according to claim 5, wherein said read-address manager comprises:

read-address register means for holding said indicator of the address in paged memory of the storage location next to be read from, and means for updating said indicator both to take account of the reading of each data item and of changes between memory pages.

9. A data handling system comprising:

a paged memory having multiple memory pages, a single circular queue made up of a plurality of segments formed in respective ones of said memory pages and each comprising a number of data-item storage locations provided in the corresponding said memory page, there being a total of N such data-item storage locations in the circular queue, a producer entity for writing a data item to the circular-queue storage location corresponding to a current write position for said circular queue, and a consumer entity for reading a data item from the circular-queue storage location corresponding to a current read position for the circular queue;

each said entity having:

a first register storing a physical-location indicator indicative of said current write/read position, as appropriate for the entity concerned, in terms of the whereabouts of the corresponding storage location in the paged memory, first update means for updating the physical-location indicator in dependence on the writing/reading of data items by the entity concerned to/from the circular queue and on a change of the memory page in which the storage location corresponding to the current write/read position is situated, a second register storing a logical-location indicator indicative of the current write/read position in terms of a position within a continuum of N locations, and second update means for incrementing the logical-location indicator on a modulo-N basis in dependence on the writing/reading of data items by the entity concerned to/from the circular queue;

the data handling means having queue status means that uses the logical-location indicators maintained by the producer and consumer entities to determine information on the current state of the circular queue.

10. A data handling system according to claim 9, wherein said queue status means comprises:

in said consumer entity, queue-empty detection means for comparing said logical-location indicators to determine when the circular queue is empty, in said producer entity, queue-full detection means for comparing said logical-location indicators to determine when the circular queue is full.

11. A data handling system according to claim 10, wherein said queue-empty detection means is operative to determine that the circular queue is empty when said logical indicators indicate the same position in said continuum of N locations, and said queue-full detection means is operative to determine that the circular is full when the logical-location indicator maintained by the producer entity indicates a position in said continuum of N locations immediately preceding that indicated by the logical-location indicator maintained by said consumer entity.

12. A data handling system according to claim 9, wherein each said segment of the circular queue further comprises a link location storing a pointer to the address in memory of a next said segment in the circular queue, said link location being in a predetermined position in each segment; at least the producer entity including a third register for holding a count indicative of the number of data-item storage locations remaining to be accessed in the current segment, said first update means of the entity concerned comprising:

means for updating said count each time a data-item storage location of the current segment is accessed, and means responsive to said count indicating that no further data-item storage locations remain to be accessed in the current segment, to extract said pointer from said link location and insert it in said first register of the entity.

13. A data handling system according to claim 12, wherein said link location of each segment further contains an indicator of the number of data-item storage locations in the next queue segment, this indicator being extracted from said link location and inserted into said third register by said first update means contemporaneously with the latter extracting the pointer from the same link location and inserting it in said first register.

14. A data handling system according to claim 9, wherein each said segment of the circular queue further comprises a link location containing a pointer to the address in memory of a next said segment in the circular queue, the data-item storage locations and link location of each segment each including a flag set to enable the link location to be identified; at least the consumer entity using said flag to identify the link location and the associated first update means being operative to extract said pointer therefrom and, after all the storage locations in the segment have been accessed, to insert said pointer in the first register.

15. A producer entity according to claim 1 wherein the paged memory is electronic storage organized in pages of addresses.

16. A consumer entity according to claim 5 wherein the paged memory is electronic storage organized in pages of addresses.

17. A data handling system according to claim 9 wherein the paged memory is electronic storage organized in pages of addresses.

* * * * *